United States Patent

[11] 3,584,284

[72] Inventors Laurence R. Beach;
Paul Hardy, both of Boulder, Colo.
[21] Appl. No. 857,441
[22] Filed Sept. 12, 1969
[45] Patented June 8, 1971
[73] Assignee International Business Machines Corporation
Armonk, N.Y.

[54] DIGITAL POSITION MEASUREMENT AND CONTROL SYSTEM
20 Claims, 10 Drawing Figs.

[52] U.S. Cl. ..................................................... 318/569,
318/603, 318/594
[51] Int. Cl. ....................................................... H05b 19/28
[50] Field of Search ............................................ 318/569,
603, 594

[56] References Cited
UNITED STATES PATENTS

| | | | |
|---|---|---|---|
| 3,343,053 | 9/1967 | Toscano et al. | 318/603X |
| 3,372,321 | 3/1968 | Inaba et al. | 318/603X |
| 3,504,245 | 3/1970 | Cotton et al. | 318/569 |

Primary Examiner—Benjamin Dobeck
Attorneys—Hanifin and Jancin and Herbert F. Somermeyer ABSTRACT: A plurality of groups of address strips is disposed along a path of travel. Each address strip may be spaced from another by a nonintegral amount with respect to discrete steps to be used in a positioning system. In each of the address strips, there are two groups of address indicia. A first group indicates work locations, while a second group indicates strip identification. Strip identification indicia brackets work location indicia along the path of travel such that a complete address may be read from either direction in one pass. A carriage movable along the path carries a second member for movement relative to a first member. The carriage includes incremental displacement measuring means. The address indicia on the strips is readable by means on the carriage and is supplied to a program control device, such as a digital computer for computing an initial delta address. The delta address is the number of discrete steps necessary for the carriage to move from the present location to a desired location. The initial delta address may numerically include compensation for varied spacings between adjacent address strips. An up/down counter receives the initial delta address and is responsive to the incremental displacement measuring means to alter the delta address toward a reference state indicative that the carriage has reached the desired location. Motor control means are responsive to the numerical contents of the up/down counter to actuate a motor on the carriage for moving it toward a desired location and further responsive to the up/down counter being in predetermined state to hold the carriage at the desired location. The up/down counter is divided into an upper and a lower portion. The initial delta address is loaded into the upper portion. The lower portion is preset at each work location to a predetermined number for converting the delta address to an integral number of discrete steps. Such presetting compensates for errors in the carriage travel and erases any nonintegral numerical information entered into the delta address by the carriage traversing one of said nonintegral spacings. Variations of the just-abstracted embodiment are discussed.

PATENTED JUN 8 1971 3,584,284

INVENTORS
LAURENCE R. BEACH
PAUL HARDY
BY
ATTORNEY

DIGITAL POSITION MEASUREMENT AND CONTROL SYSTEM

BACKGROUND OF THE INVENTION

The present invention relates to digitally controlled X-Y positioning systems and, more particularly, to a measurement and control system using both a delta and an actual addressing scheme for effecting rapid and faithful positioning movements.

Because of drift-free operation and quantized accuracy, digitally controlled positioning systems are finding increasing favor with designers of systems. For example, in automatic warehousing, automatic plotters, numerically controlled tools, and the like, digital logic controls are finding an ever-increasing utilization. In this class of digital positioning controls, there are two general types of design.

The first type is the utilization of a plurality of absolute or actual addresses for defining relative positions of two members that are relatively movable along one or more paths. The actual position of one member with respect to the other is measured and then compared with the desired actual position. If they are the same (i.e., have a predetermined relationship one with the other), the control recognizes that the two members are in a desired relative position. A work function may then be performed. Such a system requires that each desired location have its own address and that a comparison be made of that address with the desired address. In such systems, it often is impractical to predict how far the members have to move to reach a desired actual address. Therefore, the control cannot easily anticipate when the servomechanism effecting the movement between the members should be slowed down such as to avoid overshoot problems. The alternative is to operate the servomechanism at such a slow rate that overshoot does not occur. Alternatively, the absolute address may be spaced from the desired location a predetermined distance with the servomechanism then shifting to a lower speed for approaching a desired location. Such a servomechanism is known as a two-mode servo. This latter system is of particular usage wherein the one member moves in the same direction with respect to the other member before a given work function is performed. An example of this type of action is the storing of goods in a warehouse. After depositing the goods, the carriage for carrying the goods may move to another storage location before returning to a home position, usually next to a conveyor belt. In any event, when using this type of digital numerical control system, difficulties do arise in maximizing speed of relative motion without overshoot.

A second type of digital control may be termed a delta address control system. In this type of control system, the servomechanism effecting motion between the two members is controlled by a number or signal representative of the physical displacement to be effected for reaching a desired location. Generally, this type of control operates from a reference point and may have to return to the reference point for each successive motion or at best periodically return thereto to ensure that the relative displacement between the members is correct. An advantage of the delta address type of control is that control can easily detect distance from the desired location to then alter the speed of the servomechanism for avoiding overshoot problems. Again, this contemplates the use of a two-mode servomechanism. In the delta address scheme, however, it is easier to have a maximum speed up to a predetermined threshold distance from a desired location; then, the servomechanism can be converted into a proportional control wherein the speed of the servo is proportional to a numerical delta address.

Another important aspect of position controllers is the ability to traverse along distances while maintaining good accuracy and speed. Generally, the longer the movement the more difficult it is to maintain good location accuracy. As a partial solution to the problem, there have been developed a class of servomechanisms called coarse/fine servos. In one control loop, a coarse position is first determined. Then, there is mode switch to a fine or plurality of intermediately fine positioning control loops for successively controlling the servomechanism to tight and tighter location tolerances. These positioning systems require detection and a changeover technique from coarse to fine, etc. Such systems are an attempt to eliminate cumulative tolerances usually found in a positioning system of any great extent. Cumulative errors also may plague the above-described delta address systems in that there may be no facile means provided to correct for any discrepancy in positional accuracy. It is desired to have a positioning system which has an accuracy insensitive to the length of travel and has a very high-speed operation.

Some positioning systems having an elongated travel have utilized a plurality of reference points displaced along the path of travel in an attempt to maintain accuracy of positional location. In some of such systems, a first locating control will position the members with respect to a given one of such reference points. Then, a second system will take over control of the positioning and position it with respect to the given reference point a predetermined distance as may be indicated in a digital counter or the like. Such a system requires changeover from one mode of operation to another. Problems could arise when the position is relatively close to the reference point, and there is hunting or overshoot in the positioning system.

SUMMARY OF THE INVENTION

It is an object of the present invention to provide a linear digital and measurement positioning system and method for making accurate measurements over an arbitrarily long path of relative motion and which eliminates problems of cumulative tolerances and of varying spacings between adjacent work performing locations.

It is a corollary object to provide a positioning system which may accurately ascertain the present position of two relatively movable members while utilizing an actual addressing scheme for maintaining accuracy throughout the positioning motions of such members.

In accordance with the invention, the relative position of first and second relatively movable members with respect to a given path of movement is determined by an actual address indicating means and an incremental displacement measuring means. Digital control means are jointly responsive to such indicating and measuring means for controlling rapid and accurate movements between the members. The actual address indicating means includes a plurality of digital address indicia disposed along the path of travel which are respectively indicative of a plurality of actual relative locations of said members. Each actual location has a predetermined dimension along the given path of travel, and each includes a positional reference indicia which has a precise relationship with respect to such actual relative locations. Such predetermined dimension is preferably a discrete step of relative motion of the members. The incremental displacement measuring means is operatively associated with said members for indicating incremental displacements and direction of such incremental displacements. Program means receive the actual address of the present location and generate an initial delta address based upon a comparison of the present actual address with a desired actual address. Digital delta address means receive the initial delta address indicative of a necessary relative displacement of said members to reach a desired one of said locations. In effect, the reading of an actual address establishes a reference location from which movements are effected using delta address techniques. Accordingly, the present invention provides a positioning system using desirable delta address movement controls having a reference or starting point programmable with equal facility from any random location of such system.

The digital delta address means may include an up/down counter having upper and lower portions containing a present delta address. The initial delta address is loaded into the upper portion and indicates the number of discrete steps to be taken to reach a desired location. The counter is responsive to the incremental displacement means to alter its numerical content in accordance therewith to generate a present delta address indicative of the distance to move. Alternatively, the up/down counter may contain an indication of actual displacement which is compared with the initial delta address to generate a present delta address. However, there may be spacings between adjacent ones of said locations that have a nonintegral relationship to such predetermined dimensions. Such nonintegral related spacings may be counted as zero or as one or more of such discrete steps. The position reference indicia actuates the up/down counter to preset the lower portion for adjusting the then-contained delta address into a numerical representation indicative of an integral number of such predetermined dimensions. In this manner, the nonintegralness of spacings is erased and the delta address is recalibrated to an integral number of discrete steps to be moved. Such recalibration also eliminates many possible errors introducible into the system by a system malfunction or noise. The system in such situations automatically recovers from many errors without noticable effect on system positioning performance. A corollary advantageous result is that the reliability of the positioning system is extended with increased or greater design tolerances.

Motor means for effecting relative displacements between the members is controlled by a two-mode motor control system. In a first or saturated mode, the upper portion of the up/down counter contains a number exceeding a predetermined threshold. This situation causes the motor control system to effect displacement between the members at a maximum rate. Once the delta address has been reduced below such threshold, the motor control system automatically follows a proportional (linear) control of motor speed such that the two members approach the desired location at optimum velocity for minimizing overshoot. The arrangement is such that, even with overshoot, the up/down counter responds to the indicated relative displacements to count in a direction such that overshoot is compensated for. Once the up/down counter has reached a predetermined state indicative of a zero error (i.e., the delta address is effectively zero), the motor control system is effective to hold the two members in such desired location.

Even though the motor means operates in two modes, all delta displacement control is effected by the same type of incremental displacement measurements. In accordance therewith, the measurement system operates identically throughout all positioning movements irrespective of distance to move. The two-mode operation is effected through digital logic with no switching, as such, in any analog portion of the motor means. This arrangement enables the digital-to-analog converter to have a limited range of accuracy, thereby simplifying design thereof and permitting a more facile design of the converter (i.e., sensitivity can be easily improved).

The address indicia on one of the members is preferably a photographic strip representative of an array of such work locations. Each strip has a unique actual address indicia while each column of work locations has its own unique indicia modifying the array indicia. For facilitating speed of action in each address strip along the path of travel, the array indicia (the work location indicia) is arranged such that relative displacements in either direction will effect a complete reading of the actual address of each work location with a minimum of movement. Such arrangement is useful in initializing operation for minimizing movement of the two members for determining the residual location thereof. Other control indicia are included on the photographic image for effecting control action over the positioning system.

Each address strip is precisely located with respect to one or more work locations. Such precise location is independent of other work locations not associated with such address strip. In fact, location of such address strip with respect to such other work locations may be random or arbitrary. Accordingly, there are no cumulative tolerances between one address strip to any other address strip. The elimination of cumulative tolerances between address strips greatly facilitates the construction of accurate positioning systems capable of traversing long distances. Each address strip provides both address information and precision location information.

DETAILED DESCRIPTION OF THE PREFERRED EMBODIMENT

With more particular reference to the appended drawings, like numbers indicate like parts and structural features in the various views and diagrams.

Figure 1:
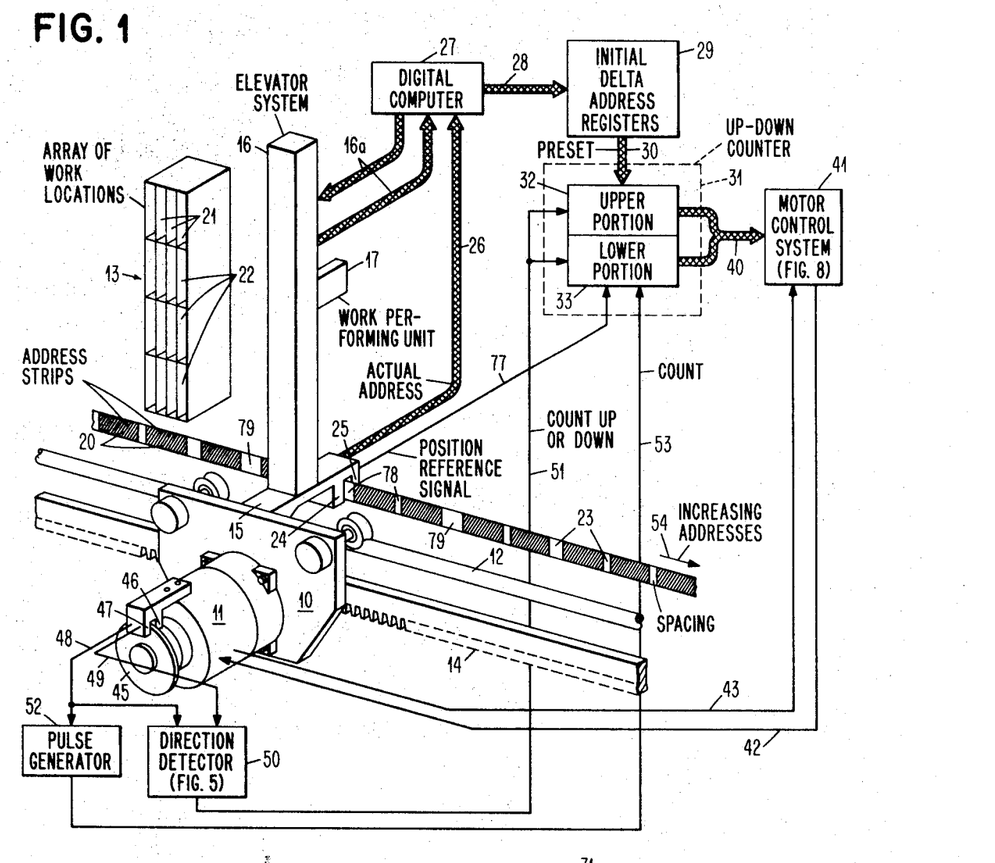
FIG. 1 is a simplified, combined, diagrammatic and schematic block diagram of a system incorporating the teachings of the present invention.

With reference now to FIG. 1, the system arrangement of an embodiment incorporating the present invention is described with respect to an X–Y positioning system. It is understood, of course, that a single axis positioning system or a three-axis positioner may use the invention with equal facility. Carriage 10 is movable by motor means 11 along elongated track 12 defining a path of movement between carriage 10 and a first or stationary member 13. Motor means 11 is drivingly engaged with toothed rack 14 stationarily associated with track 12. Alternately, a drive screw arrangement may be utilized or merely a frictional engagement between a drive wheel motor means 11 (not shown) and a driving track (not shown). Carriage 10 includes outwardly extending arm 15 securely supporting elevator system 16 which vertically moves work performing unit 17 for positioning same, as will be later described. The position sensing and motor control system usable with elevator system 16 may be identical to that described with respect to the control of carriage 10; therefore, will not be separately described.

Various discrete locations along the path of travel designated by track 12 are representable by a plurality of address strips 20. It is understood that stationary member 13 is disposed along the path of travel having an array of work locations stationarily and precisely located with respect to the respective address strips. For simplicity, only one array of work locations of member 13 is illustrated, it being understood that other arrays are provided with the respective address strips. An array of work locations of member 13 includes a plurality of columns 21 of such work locations. A different plurality of rows of work locations 22 are provided vertically and are accessed by elevator system 16 moving work performing unit 17. Therefore, in the overall system, there is an array of work locations divided into subarrays respectively associated with a plurality of address strips.

Elevator system 16, together with carriage 10, constitutes an X-Y positioning system. Such X-Y positioning systems are usable, for example, in warehousing operations; accessing a large multiplicity of record storage members such as magnetic strips, tape cassettes or cartridges, containers for record cards; and the like. Address strips 20 are spaced apart along the path of travel by any arbitrary or random spacing generally indicated by numeral 23. The later-described position sensing and control system automatically compensates for such variable spacing such that carriage 10 is accurately positioned with respect to a selected column 21 in any array of work locations. Each address strip 20 has a later-described set of actual address indicia thereon which are sensed by sensor 24 supported in carriage arm 15.

In the illustrated embodiment, an optical reading system is used wherein a light source 25 supplies light through the optical address strips 20; thence to a set of sensors 24 for photoelectrically indicating the address of the column at which carriage 10 is located or may be passing during motion. Address sensor 24 supplies the just-described sets of address signals via FIG. 7 actual address means over cable 26 to program control means or digital computer 27. In a constructed embodiment, digital computer 27 consisted of a general purpose digital computer programmed to provide the necessary control functions as described with respect to FIG. 4. For the purposes of discussion of FIG. 1, it is sufficient to state that digital computer 27 selectively receives, under its own control, actual address signals from detector 24. Computer 27 is supplied by means not shown or has stored therein a desired location to which carriage 10 is to be moved. It is also understood that computer 27 is connected directly by cables 16a to elevator system 16 for controlling same in the manner described for carriage 10. Computer 27 is jointly responsive to the actual address signals received over cable 26 and to a selected one of a desired work location to compute an initial delta address. Such initial delta address is numerically indicative of the distance carriage 10 has to be moved from its present location, as indicated by such actual address signals, to a desired new location. Such initial delta address may include numerical representation of a number of discrete steps (later described) of the various spacings to ensure that carriage 10 reaches the appropriate location without further reference to an actual address indicia. That is, the control function performed of positioning is completely performed based upon the computed initial delta address. As will become apparent, such delta address positioning functions are performable with equal facility from any actual address along the path of travel.

Computer 27, upon completion of the computation, supplies a set of digital signals over cable 28 to initial delta address buffer memory registers 29. Under control of digital computer 27, via control signals supplied through cable 28 to initial delta address registers 29, a given set of digital signals representing one initial delta address is supplied over cable 30 to up/down counter 31. Each initial address has a numerical value equal to the number of discrete steps necessary for carriage 10 to reach a desired new location from any predetermined actual address. Up/down counter 31 is arbitrarily divided into upper portion 32 and lower portion 33. Upper portion 32 receives the digital signals from cable 30 and is preset to a signal state indicative of such initial delta address. Lower portion 33 is utilized for incremental displacement operations in conjunction with the initial delta address, as will become apparent. In a system having all discrete steps the same length, such lower portion has a modulus indicative of the number of incremental steps constituting one discrete step of the positioning system.

The present signal state of counter 31, after being altered as later described, numerically contains the present delta address. That is, as carriage 10 is moved toward a desired location, the numerical contents of up/down counter 31 are altered such that its numerical contents are counted toward a first reference signal state indicative that the carriage 10 has arrived at a desired location. The present delta address in up/down counter 31 is a numerical representation of the distance that carriage 10 has yet to travel. Such signal state is continuously supplied over cable 40 to motor control system 41, which is described in some detail with respect to FIG. 8. Motor control system 41 is responsive to the digital signals received over cable 40 to supply an analog motor driving control signal over line 42 to motor means 11.

Motor control system 41 is preferably of the two-mode type. That is, when the delta address in up/down counter 31 exceeds a predetermined numerical value or threshold, either positive or negative, motor means 11 is operated at maximum velocity. Upon reaching a given threshold, the maximum velocity mode of operation is inhibited and a proportional control velocity mode is provided. That is, the velocity of carriage 10 is proportional to the displacement of carriage 10 from a desired location, as indicated by the present delta address. For accuracy and stability purposes, motor means 11 supplies velocity indicating signals over line 43 to motor control system 41, forming a closed-loop type of servomechanism control which provides a more desirable positioning control for carriage 10. The actual speed of motor means 11, hence carriage 10, is determined jointly by velocity thereof and the remaining distance to a desired location. Such types of motor control systems are known.

In order to have carriage 10 positioned accurately by reference only to a delta address in up/down counter 31, it is desirable to have a good and reliable incremental displacement measuring means. On motor means 11, there is rotational displacement measuring disc 45, later described in detail with respect to FIG. 5. Again, it is an optical measuring system having light source 46 with light detector system 47 on opposite sides of rotational measurement disc 45. Detector 47 supplies two-phase pulses respectively over lines 48 and 49 to direction detector 50. Direction detector 50 is responsive to the two-phase pulses to detect the direction of travel of carriage 10. It supplies a direction signal (i.e., count up or count down), over line 51 to up/down counter 31. It is understood that the direction signal affects up/down counter 31 in a manner that the later-described count pulses alter the numerical contents of counter 31 in accordance with the direction of motion and the sign of the delta address.

The numerical notation scheme used in up/down counter 31 can be of arbitrary choice. The signals therein may represent numbers in binary one's or two's complement notation, binary coded decimal, or other numerical notation schemes. The scheme used in the illustrated embodiment is a combination of sign plus a positive number in binary notation. The initial delta address is represented by a sign digit plus a positive number. A positive sign "R" (binary 0) represents desired movement in the direction of arrow 54 while a negative sign "L" (binary 1) represents movement in the opposite direction. Desired maximum distance to travel in either direction is represented by the sign digit being in the appropriate signal state with all other counter digit positions being in the 1 state. The sign digit is electrically disconnected from the counter digit positions such that its signal state is never affected by counter operations.

For ease in handling overshoot situations, the modulus of up/down counter 31 is made twice the modulus of a number representing maximum displacement along track 12. This selection prevents counter 31 from overflowing. For example, if the number representing maximum displacement is $2^n-1$, where $n$ is an arbitrary positive integer, then the modulus of up/down counter 31 is $2^{n+}$—Up/down counter 31 then has total $n+1$ digit positions plus the sign digit position. Without such overshoot compensation, up/down counter 31 would have $n$ digit positions plus the sign position. For purposes of discussion, the $n+1$ digit position is termed the "extra" digit of up/down counter 31. To ensure that the extra digit position is always set to a "1" when an initial delta address is loaded, circuitry (not shown) is provided to unconditionally set it to a "1" each time an initial delta address is loaded or other signal states are set thereinto as later described. It is not necessary that up/down counter 31 have such extra digit for the successful practice of the present invention. Detailed discussion of up/down counter 31 as it controls movement is with the discussion of FIG. 9.

As used in the illustrated and constructed embodiment, the addressing scheme of actual addresses starts from a zero reference address at the left-hand side of address strips 20 with increasing positively enumerated addresses extending to the right in the direction of the arrow 54. Each address strip may have a unique number. For example, the left most address strip may be number 1, the next one number 2, etc. A delta address indicating movement in the direction of arrow 54 has a positive numerical significance. As motor means 11 moves carriage 10, signals supplied over line 48 activate pulse generator 52 to generate pulses which are subtracted from the numerical contents of up/down counter 31. Pulses from generator 52 are supplied over line 53 to the least significant digit position of up/down counter 31. As the pulses are subtracted from the numerical contents of lower portion 33, it will count past a reference signal state and thence subtract one discrete step indication from upper portion 32. As such, counter 31 is a single counter divided into two portions 32 and 33 for ease in understanding of how the system operates. If carriage 10 is moved from the right to the left (i.e., in a direction opposite to the arrow 54), the present delta address contained in up/down counter 31 still has a positive numerical significance even though the sign digit indicates a negative direction of motion. Pulses from pulse generator 52 are still subtracted from the numerical contents of up/down counter 31.

If bipolar signals are used in motor control system 41, the reference signal state of up/down counter 31 indicating a desired location has been reached, may be numerical zero. In some systems, it is desired to have a unipolar voltage. Such a selection facilitates accuracy and simplifies circuit design. In such a system, the numerical value in counter 31 is double that required for a positive and negative count. The reference signal state in such an instance is equal to one-half the modulus of the counter. The numerical contents of counter 31, being less than one-half such modulus, can be defined either as a positive or negative numerical number while the numerical contents of counter 31 being greater than such one-half modulus may be defined as the opposite numerical sense. Either design choice may be used for the successful practice of the present invention. Such selections and counter configurations utilized to implement such selections are well known.

Some positioning systems have a problem with overshoot. That is, as carriage 10, for example, moves toward a desired location, it does not stop exactly at the desired location but travels beyond. Such travel beyond a desired location is termed overshoot. Because of the operation of the present invention, such overshoot is not a problem. It is seen that up/down counter 31 is bidirectional. In the event there is some overshoot, for example, the counter 31 continues to count and will count to a delta address indicative of such overshoot. Motor control system 41 is responsive to such indicated overshoot delta address to return carriage 10 to the desired location.

Motor control system 41 is further responsive to up/down counter 31 containing a delta address equal to a zero reference (i.e., up/down counter 31 is in a first reference signal state) to hold motor means 11 stationarily at the desired location. Upon computer 27 loading a new initial delta address into upper portion 32, a positioning operation is automatically initiated by the presence of such initial delta address in up/down counter 31. Any nonreference signal state condition in upper portion 32 or lower portion 33 activates motor control system 41 to cause movement of carriage 10.

Upon carriage 10 reaching a desired location and assuming that elevator system 16 has moved work performing unit 17 to its desired vertical location, work is performed. The actual address of the desired location is being supplied in signal form over cable 26 to computer 27. Digital computer 27, upon receiving the actual address of the desired location or whatever location at which carriage 10 has been positioned, compares the actual address with the desired address for verifying proper operation of the positioning system. Based upon prior knowledge of a first desired location and upon the detection that the carriage 10 is at the desired location, a new initial delta address may be loaded into upper portion 32 of up/down counter 31. It may be noted herein that a plurality of initial delta addresses may be generated based upon the assumption of proper operation of the positioning system. The computer 27, upon detection of arrival at a given desired location and upon knowing that the desired work performing function has been performed, may merely transfer a new delta address to up/down counter 31. This type of action permits ease of programming for digital computer 27 in that a plurality of computations may be made at once by a subroutine and then computed initial delta addresses may be successively loaded into up/down counter 31 for successive positioning movements of carriage 10.

Figure 2:
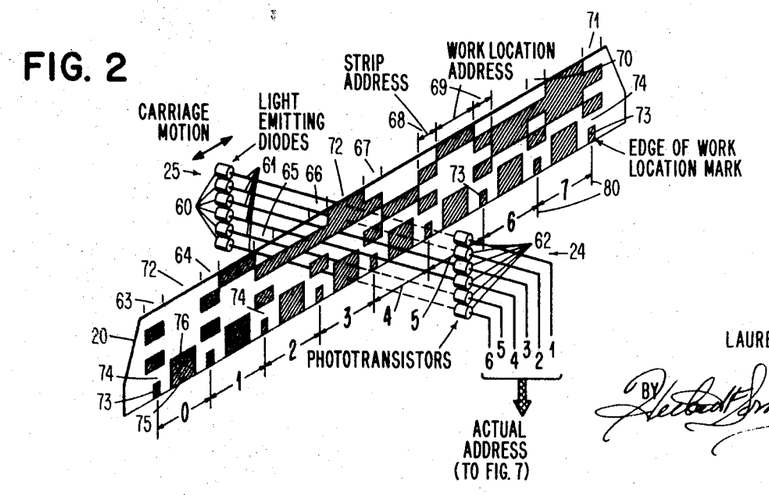
FIG. 2 is a simplified, diagrammatic showing of an actual address strip used in the FIG. 1 illustrated embodiment together with light source and light detector means.

The actual address sensing system including address strips 20, source 25, and sensor 24 is described with more particular reference to FIG. 2. The actual address sensing means also includes the logic circuits described later with respect to FIG. 7. In conjunction therewith, the recalibration of the numerical contents of up/down counter 31 to accurately reflect a plurality of integral discrete steps to compensate or correct for variable spacings 23 is fully explained. An exemplary address strip 20 is illustrated in diagrammatic form in FIG. 2, which has rectangularly arranged columns of address indicia and associated control indicia. In a practical embodiment, because of spatial considerations of photodetectors and photosources, it may be necessary and often is found necessary to stagger the columns. That is, the photodetectors for rows 1 and 2 cannot be placed one over the other because of the physical size (including mounting hardware) thereof. It is a common practice to displace such photodetectors along the path of travel of carriage 10 to accommodate such physical restriction. When the photodetectors are so displaced, address strips are redesigned from that shown in FIG. 2 such that indicia in each column thereof are displaced in the same manner as the photodetectors, such that all photodetectors simultaneously are responsive to the appropriate indicia for successively indicating strip and location actual addresses.

Light source 25 consists of six light emitting diodes 60 arranged on one side of photoaddress strip 20. Light is emitted, as indicated by lines 61, to impinge upon and selectively pass through address strip 20. A like plurality of six phototransistor type of photodetectors 62 are arranged to respectively receive light from light emitting diodes 60. Preferably the bandwidth of emitted light from light emitting diodes 60 is matched to the bandwidth of the photoresponsiveness of phototransistors 62. Digital indicia on photoaddress strip 20 consist of transparent and opaque areas which enable phototransistors 62 to generate bivalued electrical signals. The upper four rows of digital indicia, corresponding to phototransistors enumerated 1 through 4, contain the actual address of the location represented by such indicia. Such address indicia has two address portions, a strip address and a work-location address. The strip address indicia are distributed throughout the strip in the four-row columns 63—71, inclusive. The work-location address indicia within each strip are contained uniquely in the four-row columns designated collectively by numeral 72.

In the illustrated strip, there are eight work locations enumerated by addresses 0—7 in binary coded form. Bracketing, in the direction of travel, each of the work-location addresses are a pair of strip address columns. The purpose of such spatial distribution of the strip address indicia is to facilitate detection of actual address with minimum movements of carriage 10. Assuming that carriage 10 is to be moved to the right, as shown in FIG. 2, a complete actual address is detectable by movement of less than one work location, irrespective of location of carriage 10 with respect to strip 20. For example, if carriage 10 is located such that detector 24 is positioned opposite indicia column 66, that strip address is supplied to computer 27. By movement of carriage 10 to the right, the work-location bearing binary numeral 3 is detected. By such small movement, the digital computer 27 immediately knows that carriage 10 is positioned in cell 3 of strip 20. Correspondingly, if detector 24 is positioned opposite a column 72, such as the one indicating binary 3, such work-location address is supplied to computer 27. Movement of carriage 10 to position detector 24 opposite column 67, for example, yields a complete actual address to digital computer 27. It is apparent from inspection of FIG. 2 that such short movements in either direction yield a complete actual address of carriage 10 without requiring scanning eight rows of address indicia for each work location. The illustrated arrangement reduces the hardware required (i.e., the light emitting diodes and phototransistors as well as other logic circuitry) in the actual address measurement system. Such arrangement is also used in the later-described initialize or startup operation.

Rows corresponding to phototransistors 5 and 6 in address strip 20 are used as control indicia in cooperation with the digital address indicia of rows 1 through 4. By definition, an opaque area in row 6 and a transparent area in row 5 indicate strip addresses in columns 63—71, and are disposed between columns of work locations on member 13. When both rows 5 and 6 have opaque areas, such as areas 75 and 76, a work-location address is indicated. The other two combinations of opaque and transparent areas are ignored. Opaque indicia 73 and transparent indicia 74 also precisely define the extremities of columns 21 of work locations in first member 13. Such indicia are the position reference indicia of the illustrated system. That is, when detector 24 supplies signals indicative of indicia areas 73 and 74, a position reference signal is supplied over line 77 to preset lower portion 33 of counter 31 to a predetermined signal state, which action recalibrates the delta address to an integral number of discrete positional steps, as is now described.

A purpose of position reference signal on line 77 recalibrating counter 31 is to compensate for the variable spacings 23 between adjacent address strips. As best seen in FIG. 1, spacings between adjacent strips are subject to wide variations. For example, spacings 78 are relatively narrow, while spacings 79 are quite wide. Other spacings have different lengths than either spacings 78 or 79. Such different length spacings may have a nonintegral distance with respect to the distances represented by the count in upper portion 32. It is remembered that the numerical contents of up/down counter 31 digitally represents a given delta displacement along track 12. Since lower portion 33 has the lower significant digit positions of up/down counter 31, the least significant digit of upper portion 32 is representative of the displacements represented by the modulus of lower portion 33. In the illustrated embodiment, lower portion 33 has a modulus representative of the displacement across one work location; defined herein as one discrete step of the positioning system. Referring to FIG. 2, such a discrete step along track 12 (FIG. 1) is between the dashed lines 80 (i.e., the distance between two adjacent position reference signal marks 73, 74).

It is desired to position carriage 10 to the center of a work location (i.e., the center of the work-location indicia 75, 76). Motor control system 41 holds motor means 11 to a predetermined static condition whenever up/down counter 31 is in a given reference signal state. Insofar as lower portion 33 is concerned, such reference signal state has been arbitrarily chosen to be all zeros. Since the modulus of lower portion 33 is equal to the total distance across one work location, position reference signal supplied over line 77 presets lower portion 33 such that zero is reached at the center of a work location. Therefore, lower portion 33 is set to be equal to one-half of its counting modulus. For purposes of discussion, assume each discrete step has "K" incremental displacements, represented by K pulses supplied over line 53. Then lower portion 33 is preset to K/2. In a straight binary counter, where K is $2^n$ ($n$ is any integer) this action corresponds to setting all of the digit positions or counter stages to the zero state except the most significant digit position which is set to the one state. Alternately, the most significant digit position could be set to the zero state, and all of the other digit positions or counter stages be set to the one state. In either event, the lower portion 33 is counted to zero or other reference count in a displacement equal to one-half the distance across one of the illustrated work locations. As illustrated in FIGS. 1 and 2, the displacements across each work location have been arbitrarily chosen to be constant. This selection simplifies the control circuitry. However, by proper programming and supplying of appropriate indicia on address strips 20, various lengths of work locations may be provided.

Figure 3:
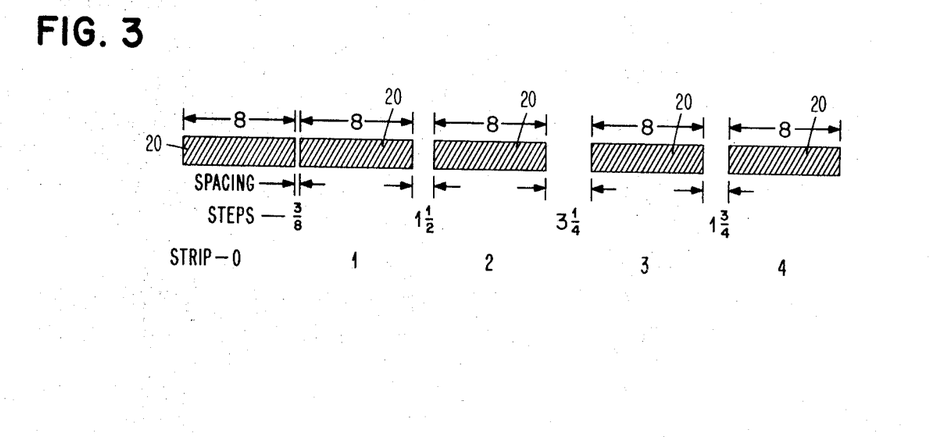
FIG. 3 is a diagrammatic showing of a plurality of address strips with arbitrary and different spacings therebetween.

The resetting and recalibration of up/down counter 31 by the various position reference marks used to generate the position reference signal supplied over line 77 is now explained with respect to FIGS. 2 and 3. In the illustrated embodiment, each strip 20 contains address indicia for eight work locations. Accordingly, in FIG. 3, which is not drawn to scale, each of the address strips 20 is shown as containing eight discrete steps, each step having a length equal to the width of a work location illustrated in FIG. 2. FIG. 3 illustrates four spacings between five address strips 20, each of the spacings having a different length. For purposes of further discussion, a set of spacings between 10 address strips 20 (numbered 1—10), the actual spacing between adjacent ones of such strips and the address spaces for the purposes of controlling carriage 10 is set forth below in Table I:

TABLE I

| Spacing address (strips) | Actual spacing length (steps) | Address spaces (steps) |
|---|---|---|
| 0-1 | 3/8 | 0 |
| 1-2 | 1½ | 2 |
| 2-3 | 3¼ | 3 |
| 3-4 | 1¾ | 2 |
| 4-5 | 5/8 | 1 |
| 5-6 | 3¾ | 4 |
| 6-7 | ¾ | 1 |
| 7-8 | ½ | 1 |
| 8-9 | 4⅛ | 4 |
| 9-10 | 3⅝ | 4 |

The calculated initialed delta addresses for a plurality of present addresses and desired addresses using the spacings set forth in TABLE I, representative of a plurality of successive carriage 10 positioning movements, is set forth below in Table II:

TABLE II

| Present address | | Desired address | | Initial delta address steps (decimal) |
|---|---|---|---|---|
| Strip Number | Work location | Strip Number | Work location | |
| 2 | 3 | 9 | 4 | +73 |
| 9 | 4 | 1 | 6 | −79 |
| 1 | 6 | 1 | 3 | −3 |
| 1 | 3 | 10 | 7 | +89 |
| 10 | 7 | 5 | 4 | −56 |
| 5 | 4 | 6 | 3 | +7 |
| 6 | 3 | 3 | 3 | −31 |
| 3 | 3 | 0 | 4 | −28 |
| 0 | 4 | 1 | 5 | +9 |

With combined reference to FIG. 3 and Table I, it is seen that address strip 0 is spaced from address strip 1 by three-eighths of a discrete step; that is, three-eights the length of a work location, as defined with respect to FIG. 2. Since the actual spacing length is less than one-half a discrete step, the addressing system sees no space and, therefore, the delta address for moving from strip 0 to strip 1 or vice versa, requires a delta address of 0. That is, to move from strip 0 location 7 to strip 1 location 0 requires a delta address of 1, since one movement for addressing purposes is one discrete step. On the other hand, the actual spacing between address strip 1 and address strip 2 is 1½ discrete steps. The addressing scheme interprets the 1½ spacings as two discrete steps. Generally, any spacing between 0 and one-half of a discrete step is counted as a "0" address space, while any spacing between one-half and a complete step is counted as one discrete step. For a plurality of discrete steps constituting one spacing between two adjacent address strips, the submultiples of address strips less than one-half of a discrete step are not counted while nonintegral portions of a discrete step greater than one-half are counted as complete steps.

The reasons for this type of addressing are best understood by referring back to FIG. 1 and remembering that each time a position reference mark is detected, lower portion 33 of up/down counter 31 is preset to K/2 (i.e., equal to a numerical count representative of one-half of a discrete step). It is also remembered that, as lower portion 33 counts past a reference signal state (i.e., all binary 0's, for example), a discrete step is subtracted from the numerical contents of upper portion 32 in accordance with the travel of carriage 10.

Return now to the actual spacings of three-eighths of a discrete step between the 0 and 1 address strips illustrated in FIG. 3. As carriage 10 left address strip 0, the last position reference indicia, which may be mark 80 shown in FIG. 2, lower portion 33 is set to K/2. However, before lower portion 33 counts through the reference signal state of all the 0's, sensor 24 on carriage 10 has reached address strip 1 and its first appearing position reference indicia, representable by 73 and 74 of FIG. 2, presets lower portion 33 to K/2. Therefore, during traversing the spacing between address strip 0 and address strip 1 upper portion 32 remains unaltered. Since lower portion 33 has been again preset to K/2, it appears to the addressing system and to the servomechanism that there has been a zero or no space between address strip 0 and address strip 1.

With regard to the spacing between address strip 1 and address strip 2, it is easily seen that lower portion 33 counts past the zero reference signal state twice in 1½ discrete steps, thereby subtracting two from upper portion 32 numerical contents. Accordingly, as shown in Table I, the address spacing between address strips 1 and 2 is equal to two discrete steps. In a similar manner, the spacings between 10 such address strips is illustrated in Table I for variant spacings of lengths which are not integral to the length of the above-defined discrete steps.

Table II presents examples of initial delta-address calculations for a succession of addresses and corresponding positional movements of carriage 10 made with respect to the spacings between address strips listed in Table I. Initially, the first present address is on strip 2, work location 3; while the first desired address is on strip 9, work location 4. Table II shows that it takes 73 discrete steps (decimal notation) to move from strip 2, location 3, to strip 9, location 4. The initial delta-address calculation is as follows: the movement from strip 2, location 3, to strip 2, location 7, is four discrete steps; movement from strip 2 to strip 3 is three steps (see Table I); traversal of strip 3 is eight steps; movement from strip 3 to strip 4 is two steps; traversal of strip 4 is eight steps; movement from strip 4 to strip 5 is one step; traversal of strip 5 is eight steps; movement from strip 5 to strip 6 is four steps; traversal of strip 6 is eight steps; movement from strip 6 to strip 7 is one step; and traversal of strip 7 is eight steps; movement from strip 7 to strip 8 is one step; the traversal of strip 8 is eight steps; movement from strip 8 to strip 9 is four steps; and, finally, movement from strip 9, location 0, to strip 9, location 4, is five steps, making a sum total of 73 steps. By definition, since carriage 10 is being moved from a lower numbered strip toward a higher numbered strip, the delta address is positive.

On the second line of Table II, there is illustrated a movement from a present address of strip 9, location 4, to a desired address at strip 1, location 6. Such movement requires a delta address of −79 (decimal notation). This address is calculated in the same way as above-described, but is negative in sign because it is moving from a higher numbered strip to a lower numbered strip. In counter 31, −79 is represented by a binary 1 in the sign digit position and binary representation of 79 in upper portion 32. Similarly, movement within the same strip, as shown in line 3, will carry a negative sign when moving from a higher numbered work location toward a lower numbered work location. The reverse is also true. Actually, when there is provided automatic calculation of the initial delta address, the calculation route set out above is not followed. Several shortcut methods are employed to reduce calculation time and improve calculation efficiency. One flow chart of a computerized initial delta-address calculation is set forth in abbreviated form in FIG. 4.

Figure 4:
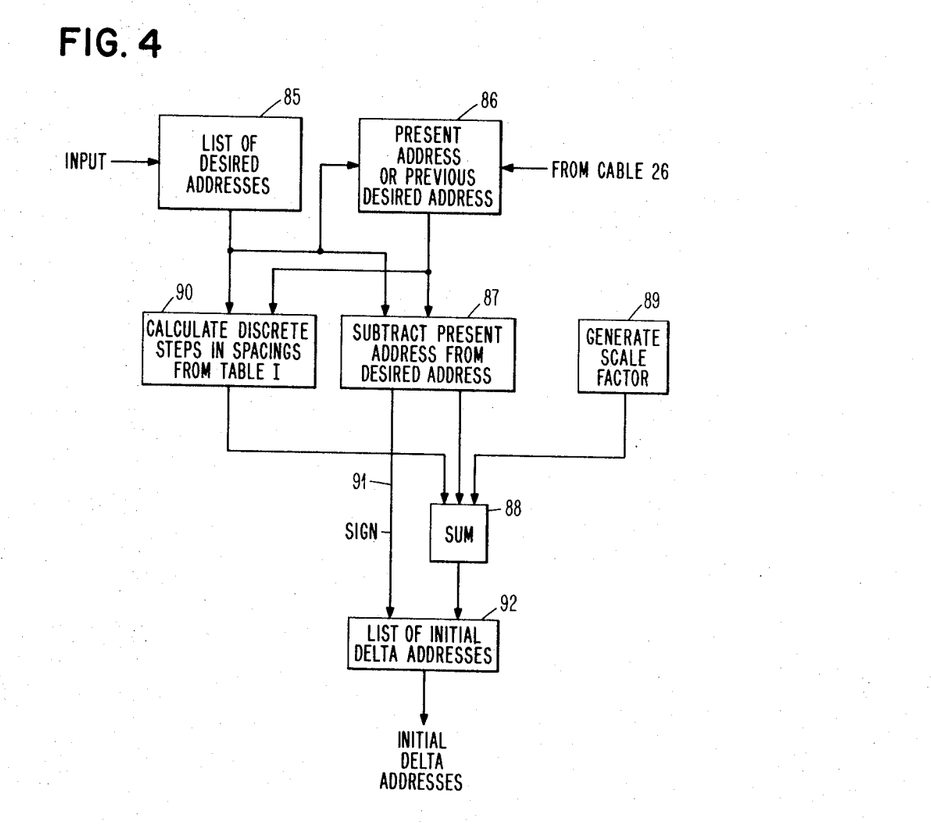
FIG. 4 is a simplified flow diagram showing how a program means may generate an initial delta address.

Referring now to FIG. 4, an abbreviated software organization usable for the calculation of the list of initial delta addresses is described. A list of desired addresses 85 is first generated by separate routines. In the first calculation, the present address 86 is received over cable 26 from the FIG. 1 illustrated system. At 87, the present address is subtracted from the first desired address and summed at 88 with the scale factor 89 and the calculated number of discrete steps in spacings based upon Table I, as at 90. If a negative result occurs, the delta address is converted to a positive number. Scale factor 89 may adjust the numerical value of the generated initial delta address to provide a nonzero reference count. Such scale factor avoids the use of bipolar control signals in such motive system.

The subtraction of the present address from the desired address at 87 also determines the sign which is supplied separately over line 91 to a memory 92 which stores a list of positive binary-coded initial delta addresses as summed by summer 88, together with the sign carried over line 91. After the first calculation, the previously used desired address is considered the present address, and a second initial delta address is calculated. The routine is repeated until the complete list of initial delta addresses is generated and placed in a memory. It is understood, of course, that one initial delta address may be calculated at a time.

Figure 5:
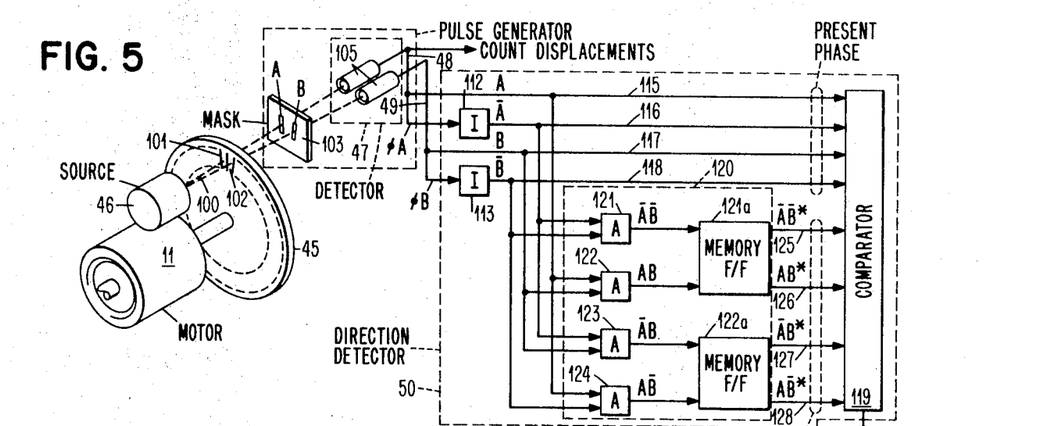
FIG. 5 is a simplified, combined, diagrammatic and schematic block diagram showing an incremental displacement measuring means used with the FIG. 1 illustrated embodiment.
Figure 6:
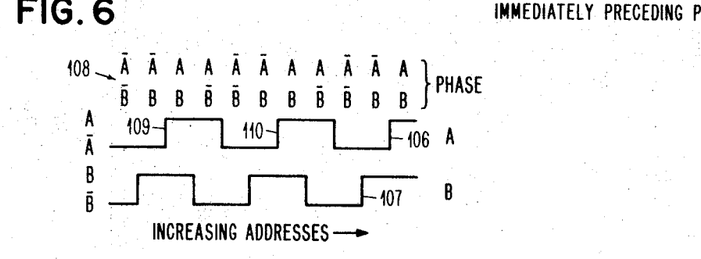
FIG. 6 is a set of waveforms and logic symbols used to describe the operation of the FIG. 5 illustrated apparatus.

The description now turns to the various component subsystems. Referring first to FIGS. 5 and 6, the incremental displacement measurement means of the system is described. This means includes not only direction detector 50, but also the source 46, detector 47, pulse generator 52, and incremental displacement disc 45 on motor means 11. Light source 46 is disposed on one axial side of incremental displacement measuring disc 45. It supplies a beam of light 100 through disc 45 to detector 47. Disc 45 includes a series of circumferentially disposed and radially extending alternate opaque areas 101 and transparent areas 102 for "chopping" the light beam in accordance with the rotational displacement of measurement disc 45, as is well known in the art. To obtain a two-phase light signal for detector 47, mask 103 is interposed between rotating disc 45 and detector 47. Mask 103 has apertures $A$ and $B$, respectively, for generating phase $A$ and phase $B$ displacement indicating light signals. Detector 47 consists of two individual photoresponsive devices 105. Photoresponsive devices 105 generate a relatively positive signal when receiving light through mask 103, and a relatively negative signal when not receiving such light. Photodetectors 105 generate $A$ and $B$ signals 106 and 107, shown in FIG. 6, in response to the $A$ and $B$ light signals. The positive portions of signals 106 and 107 indicate that light is being received and are denominated as $A$ or $B$. The negative portions corresponding to opaque areas are designated as $\bar{A}$ and $\bar{B}$. Apertures $A$ and $B$ being displaced along the circumference of disc 45 receive light from the same transparent area at successive times in accordance with the direction of rotation of disc 45. The two generated signals are 90° phase shifted with the comparison of the two phases being shown by the logic symbols 108. Going from left to right in FIG. 6, the first-occurring phase is $\bar{A} \bar{B}$, the next $\bar{A} B$, and so forth. Examination shows that there are four distinct phase combinations of signals 106 and 107. The time of occurrence of such phases is an unambiguous indication of direction rotation of disc 45. Therefore in order to determine the direction of rotation of motor means 11 and, hence, the direction of travel of carriage 10, one compares the immediately preceding phase of signals 106 and 107 with the presently occurring phase. This function is accomplished by direction detector 50. Additionally, the phase A signals are used to activate pulse generator 52 (FIG. 1) for creating count pulses to indicate the number of incremental displacements of carriage 10. It is apparent that either phase A or phase B may be used. In the present embodiment, the count pulses are generated by generator 52 for each positive going transition of signal 106, as at 109 and 110.

Direction detector 50 receives A and B signals 106 and 107, respectively, over lines 48 and 49. A pair of signal inverters 112 and 113, respectively, invert the polarity of signals 106 and 107 to generate what is termed in direction detector 50, the $\bar{A}$ and $\bar{B}$ signals. That is, when the signal on line 48 is negative (i.e., representing $\bar{A}$) then the output signal amplitude of inverter 112 will be positive. Conversely, when signal 106 is positive, the output of signal inverter 112 is negative. Inverter 113 supplies a relatively positive signal indicative of the $\bar{B}$ phase of signal 107 and a relatively negative signal indicating the B phase. All four present phases are supplied respectively over lines 115, 116, 117, and 118 to comparator 119. Whenever a positive signal appears on any of the lines 115—118, inclusive, there is an electrical indication to comparator 119 that that particular signal state is occurring in the respective signals 106 and 107. The same is true when such signals are supplied to one increment memory unit 120, which temporarily stores the signal information. The signal information is stored and delayed before being applied to comparator 119 such that the immediately preceding phase of signals 106 and 107 is also supplied to comparator 119.

Memory unit 120 includes a set of four input AND gates 121, 122, 123, and 124. Each of the AND gates determines one of the four phases set out in FIG. 6, and as identified in Boolean form on the output lines of the respective AND circuits. Temporary memory is provided by flip-flops 121a and 122a, which receive setting and resetting signals from the just-described AND circuits. The output lines of the two flip-flops are connected to comparator 119. In the description below, the asterisk following a Boolean term indicates it represents the phase information for the immediately preceding phase. Accordingly, lines 125 through 128 carry signals respectively from AND gates 122—124, which are delayed at least one phase. From inspection of FIG. 6, it is seen that, for each cycle of four phases, each of the flip-flops 121a and 122a are set and reset to the respective states. For example, flip-flop 121a is set to $\bar{A}\bar{B}$ and remains so until two phases later when signal A B resets the flip-flop.

Comparator 19 is operative to the present phase signals and to the immediately preceding phase signals to generate a count-up or count-down signal to be supplied over line 51 for up/down counter 31. Since the logic of comparator 119 can be accomplished in many different ways and the fact that Boolean expressions are well understood and easily relatable to the implementation thereof, only the Boolean expressions for comparator 119 are described. For convenience, the letter D represents that carriage 10 is being moved to the right (i.e., in a positive direction) while the Boolean symbol $\bar{D}$ represents movement of carriage 10 to the left. The logic of comparator 119 is: (1) $D=(\bar{A}\bar{B}^*)\,(\bar{A}B)+(A B^*)\,(A\bar{B})+(\bar{A}B^*)\,(A B)+(A\bar{B}^*)\,(A\bar{B})$ (2) $\bar{D}=(A\bar{B}^*)\,(A\bar{B})+(A B^*)\,(\bar{A}B)+(\bar{A}B^*)\,(\bar{A}\bar{B})+(A B)$.

Figure 7:
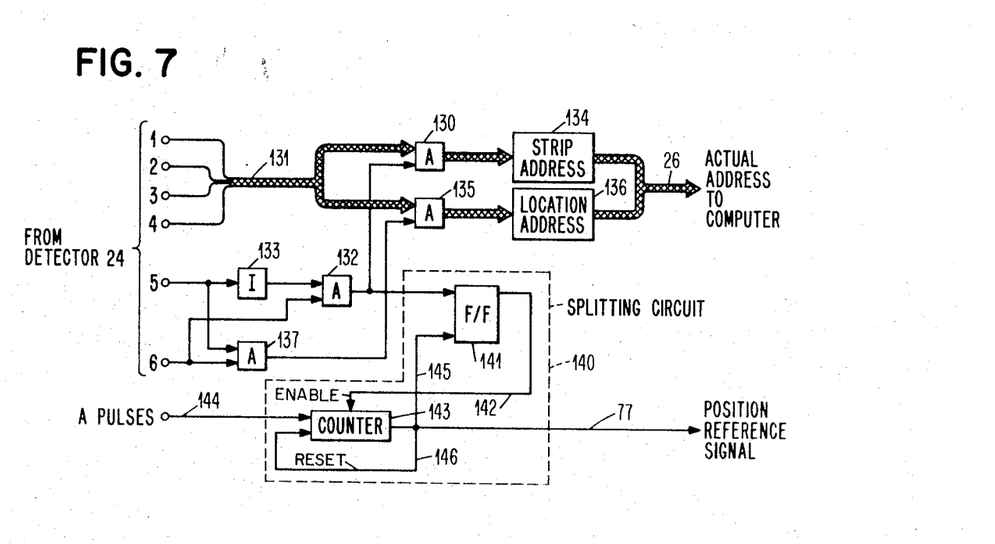
FIG. 7 is a simplified block signal flow diagram of a selected portion of an actual address measuring means and a positional reference determining means used in connection with the FIG. 1 illustrated system.

Circuitry suitable for transferring actual address signals and for precisely determining the position reference signal is described with respect to the simplified signal flow diagram of FIG. 7. It is remembered that a strip address is provided whenever rows 5 and 6 of such address strip respectively have transparent and opaque areas. The work-location address is detected when both rows 5 and 6 have opaque areas. Actual address signals are supplied by detector 24 (FIG. 1) over cable 131 to a set of four AND gates collectively shown as AND circuit 130. AND circuit 132 is responsive to row 5 being transparent and row 6 opaque to enable AND circuit 130 to pass such address signals to strip address register 134 wherein such signals are then available to comparator 27. The signal from row 5 phototransistor 62 is supplied through signal inverter 133 to provide a positive signal to AND circuit 132 when a transparent area is detected. The 6th row phototransistor is connected directly to AND circuit 132 for providing coincidence detection of an opaque row 6 area with a transparent row 5 area. Transmission of the actual address to computer 27 can follow any of several techniques which are known to the trade.

In a similar manner, a set of four AND circuit gates 135 are enabled to pass the same four signals from the first four rows of phototransistors 62 to buffer register 136 for storing the work-location address and, thence, supplying same over cable 26. AND circuit 137 is jointly responsive to both the rows 5 and 6 phototransistors 62 (FIG. 2) generating a signal indicative of opaque areas 75 and 76, for example, to supply a gate enabling signal to the set of four AND gates 135.

The accurate determination of the position reference signal is accomplished by indicia-splitting circuit 140. The width of the opaque area 73 (FIG. 2) constituting part of the position reference indicia is a predetermined number of incremental steps, for example, 10. It is desired to emit the position reference signal at the exact center of such indicia (such position reference signal may be emitted at any point with respect to opaque area 73). Since it is known that the width is exactly 10 incremental displacements; that is, the displacements corresponding to 10 positive transitions of signal 106 of FIG. 6, a count-to-five circuit is used to determine the exact center. The center is determined with equal facility in either direction of motion of carriage 10. The leading edge of opaque area 73 is used in conjunction with transparent area 74 to actuate and circuit 132 (which is also used for transmitting the actual strip address to register 134). This leading edge is supplied to and triggers flip-flop 141 to an active condition. When in such active condition, flip-flop 141 supplies a count enabling signal over line 142 enabling counter 143 to be responsive to the A pulses supplied over line 144. Line 144 is, in turn, connected to and receives A pulses from line 53 of FIG. 1. After counting five A pulses supplied over line 144, counter 143 supplies an output pulse over line 77, which is the position reference signal, precisely in the center of opaque area 73. The position reference signal is also supplied over line 145 to reset flip-flop 141 to its inactive condition, thereby disabling further counting operations by counter 143. It is also supplied over line 146 to preset counter 143 to a desired initial signal counting state. For example, initial state may be a binary 5 and the state causing emission of a position reference signal may be binary 0.

Figure 8:
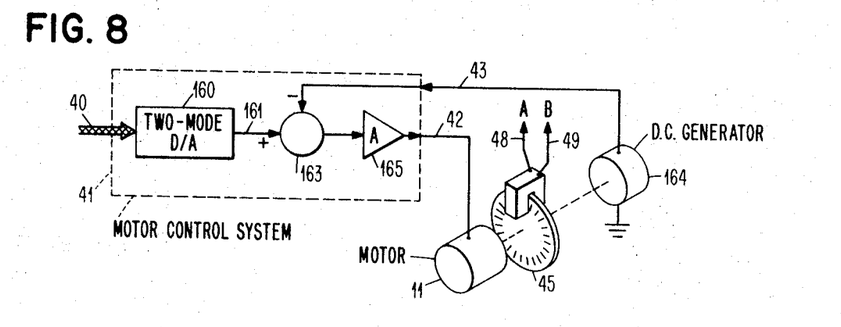
FIG. 8 is a simplified block diagram of a motor control system used with the FIG. 1 illustrated embodiment.
Figure 9:
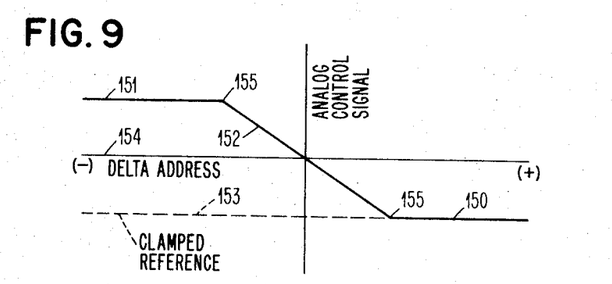
FIG. 9 is a graph showing the operational characteristics of the FIG. 8 apparatus.

The positioning control servomechanism used in the FIG. 1 illustrated embodiment is described with respect to FIGS. 8 and 9. The positioning control operates in accordance with the characteristics shown in FIG. 9. When carriage 10 is a predetermined distance from the desired location, motor means 11 is operated at a constant maximum velocity indicated by line 150 for moving from left to right and line 151 for moving from right to left. When the threshold distance from the desired location is reached, as at points 155 in FIG. 9, the positioning operation automatically moves from maximum rate of transport for carriage 10 to a rate of transport which is proportional to the distance from the desired location. Of course, this distance is represented by the present delta address in up/down counter 31. The velocity characteristics indicated by line 152 shows an idealized proportional speed response of motor means 11.

In some positional controls, lines 150 and 151 would represent opposite polarity control signals used in a servomechanism. For ease of circuit design and signal manipulation, the analog control signal used to operate motor means 11 is limited to a potential indicated by dotted line 153 which is the maximum potential indicated by solid line 150. The reference (i.e., the signal amplitude of the analog control signal in the servomechanism) which indicates carriage 10 has reached a desired position is indicated by horizontal line 154.

Referring next to FIG. 8, the motor control system is described in a manner that the operating characteristics of FIG. 9 will be better understood. The present digital delta address contained in up/down counter 31 is continuously supplied over cable 40 to motor control system 41. In system 41, two-mode digital-to-analog converter 160 receives the digital delta address and converts same into an analog delta address signal supplied over line 161. Converter 160 is operable in two modes, (1) a saturated mode, and (2) a proportional mode. Saturated mode is actuated by selected digit positions of upper portion 32. Converter 160 is responsive to numerical information contained in such selected digit positions to supply maximum analog delta address signals over line 161 indicated respectively by lines 150 and 151 in FIG. 9. For example, the upper four digit positions of upper portion 32 may be the selected digit positions used to cause converter 160 to supply a maximum or minimum amplitude signal. Such maximum or minimum amplitude signals cause motor means 11 to actuate carriage 10 to move at a maximum velocity. Circuitry may be provided in converter 160 for inhibiting operation of the linear conversion portion during the saturated mode.

When such four-digit positions in upper portion 32 contain appropriate information, this is the indication that the displacement threshold from the desired work location has been reached and the servomechanism positioning controller should switch to proportional speed control of carriage 10. At this time, the maximum signal, indicated by lines 150 and 151, is removed and the linear portion of the converter 160 supplies the proportional signal indicated by line 152 over line 161 in response to the digital signals received over cable 40. Linear digital-to-analog converters are well known and will not be further described for that reason. It is understood that the informational content in the four-digit positions of upper portion 32 may merely activate a gate (not shown) which blocks the passage of the linear or proportional analog signal. By removal of such numerical information in the upper 4 bits, the gate may be enabled to pass the proportional analog signal. The just-described apparatus permits maximum accuracy to be provided in the proportional control mode in that the range of proportional operation is limited by design choice.

The numerical content of up/down counter 31 with respect to desired movements and resultant motor means 11 operation is set forth in tabular form in Table III below:

TABLE III

| Desired movement | Counter digit positions | | | | | | | | |
|---|---|---|---|---|---|---|---|---|---|
| | Sign | \ Upper portion | | | | | Lower portion | | |
| | | $2^n$ | $2^{n-1}$ | $2^{n-2}$ | $2^{n-3}$ | $2^{n-4}$ ... | $2^{k-1}$ ... | | $2^0$ |
| +Max | 0 | 1 | 1 | X | X | X X | X | X | X |
| +Max | 0 | 1 | 0 | 1 | X | X X | X | X | X |
| +Knee* | 0 | 1 | 0 | 1 | 0 | 0 0 | 0 | 0 | 0 |
| +Knee | 0 | 1 | 0 | 0 | 1 | 1 1 | 1 | 1 | 1 |
| +Location | 0 | 1 | 0 | 0 | 1 | 0 0 | 1 | 0 | 0 |
| Ref | 0 | 1 | 0 | 0 | 1 | 0 0 | 0 | 0 | 0 |
| −Max | 1 | 1 | 1 | X | X | X X | X | X | X |
| −Max | 1 | 1 | 0 | 1 | X | X X | X | X | X |
| −Knee* | 1 | 1 | 0 | 1 | 0 | 0 0 | 0 | 0 | 0 |
| −Knee | 1 | 1 | 0 | 0 | 1 | 1 1 | 1 | 1 | 1 |
| −Location | 1 | 1 | 0 | 0 | 1 | 0 0 | 1 | 0 | 0 |
| Ref | 1 | 1 | 0 | 0 | 1 | 0 0 | 0 | 0 | 0 |

In Table III, the letter "n" is any arbitrary positive integer, while the letter "x" represents the signal state of the digit position can be either 0 or 1 (i.e., does not affect the desired movement insofar as mode of operation is concerned). The ellipsis between enumerated digit positions indicates any arbitrary number of digit positions may be inserted therein. Table III is correlated with the FIG. 9 illustrated characteristic of motor means 11. In Table III, the "0" sign indicates positive delta address corresponding to movement to the right of the vertical ordinate of FIG. 9. The first two lines are labeled "+max" indicating maximum velocity in the positive direction corresponding to line 150 in FIG. 9. Such maximum movement occurs whenever the $2^{n11}$ and $2^{n12}$ digit positions have a binary 1 therein and the $2^n$ or extra digit position is a binary 1. As discussed above, the $2^n$ digit position is always preset to binary 1. If it is a binary 0, it is an abnormal condition not important to an understanding of the present invention. Such condition is not discussed since it pertains only to logic circuitry and in a practical situation would not probably be encountered. The third line is labeled "+knee*" which corresponds to the point on line 150 immediately adjacent knee 155 but still calling for maximum velocity of carriage 10. The fourth line is labeled "+knee" and represents the linear portion 152 immediately adjacent the knee 155 just discussed. This is a smooth transition since there is only one digit position (i.e., the least significant digit position $2^0$) change with a very small change in velocity. Such a transition is smooth and is not noticable in the carriage 10 motion. The motor means 10 together with its control is now in the proportional mode indicated by line 152.

The characteristic numerical content of counter 31 in the linear or proportional mode is with the 0 or positive sign in that both digit positions $2^{n11}$ and $2^{n12}$ contain binary 0's. As movement continues in the proportional mode, the desired location is approached. At the edge of such desired location, the lower portion of the counter containing digit positions $2^{k11}$ through $2^0$ are preset to K/2 as indicated in line labeled "+location." It should be noted that in the upper portion the digit position $2^{n13}$ is a binary 1, while all other digit positions are 0 except $2^n$, which must remain a binary 1 because of the counter being twice the modulus of the numerical representation of the length of track 12. Pulses received by counter 31 continue to decrement the count from K/2 to the reference signal state indicated in the line labeled "Ref." Such reference signal state is represented by all 0's in counter 31 except for binary 1's in the $2^n$ and $2^{n13}$ digit positions. Any overshoot of travel by carriage 10 would be represented by additional 1's being subtracted from the number in the reference line. Since the counter 31 would then be below the reference number, direction of travel of motor means 11 is reversed under control of direction control 52 illustrated in FIG. 1. In any event, irrespective of overshoot, the carriage 10 will be centrally positioned in a desired work location when counter 31 contains the numerical contents set forth in the reference line.

For movement in the negative direction, as represented by line 151 and that portion of line 152 to the left of the vertical ordinate in FIG. 9, the bottom six lines of Table III represent the numerical contents. These lines may be compared with the numerical contents of the first six lines of Table III for the positive direction with the sole exception that the sign digit is a 1 rather than a 0. Operation otherwise is identical.

If carriage 10 overshoots $2^{n13}$ discrete steps, a binary "0" is counted into the $2^n$ digit position. Motor control 41 is responsive to $2^n$ being a binary "0" to operate motor means at maximum velocity in a direction opposite to that indicated by the sign or direction digit. When the overshoot is corrected to an extent that $2^n$ is restored to a binary "1," motor control 41 returns to the proportional mode and reaches the desired location as above described—but from the opposite direction. It is to be understood that an overshoot of $2^{n13}$ discrete steps is indeed an unusual situation. Such an overshoot most probably would never be encountered unless something is abnormal in system operation.

In motor control system 41, summer 163 receives analog control signal supplied over line 161 and compares same with a velocity signal received over line 43 from DC tachometer generator 164 of motor means 11. Summer 163 supplies a proportioned control signal through amplifier 165 over line 42 to the motor means 11. From inspection of FIG. 8, it is apparent that the output signal of converter 160 supplied over line 161 serves as a proportional control set point for motor means 11. Motor means 11, being operatively coupled to its DC tachometer generator 164, completes a closed loop motor control system via feedback line 43. Operation of such a motor control system is well understood and will not be further described for that reason. Also operatively coupled to motor means 11 is incremental displacement disc 45 which supplies the A and B pulses above described, respectively, over lines 48 and 49. It is understood that a digital logic circuit may be made responsive to disc 45 rotation as a substitute for DC tachometer generator 164 in supplying velocity signal to summer 163.

Figure 10:
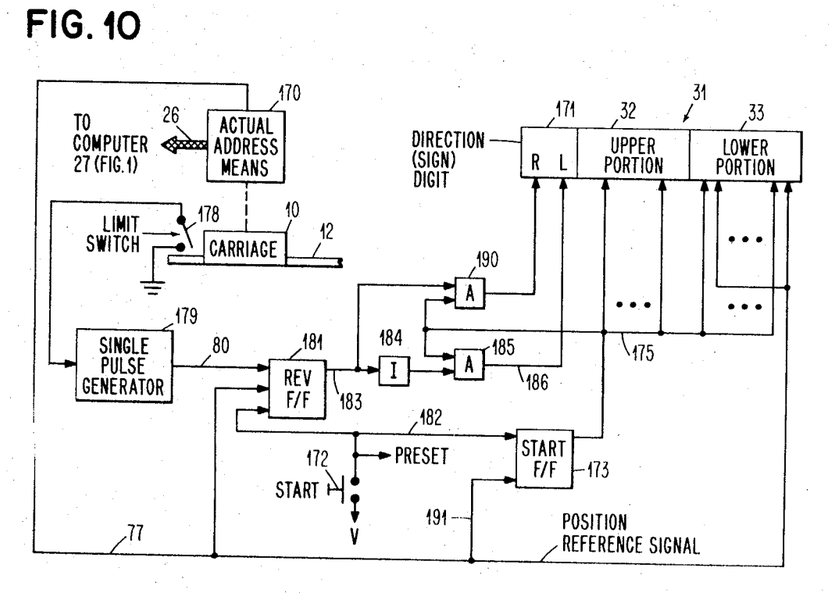
FIG. 10 is a simplified diagrammatic and signal flow diagram of a startup arrangement for the FIG. 1 illustrated system.

A startup mechanism for the FIG. 1 illustrated system providing a minimum initial movement of carriage 10 at any random location along the path of travel is described with particular reference to FIG. 10. Therein, carriage 10 is diagrammatically shown as a box which is relatively movable along track 12. Actual address means 170 is operatively associated with carriage 10 and may be constituted by the address strips 20 in combination with the source 25, sensor 24 of FIG. 1, plus the FIG. 7 circuits. Up/down counter 31 includes a direction or sign digit position 171 which is the most significant digit position of upper portion 32. In the illustrated system, sign digit position 171 is electrically independent of the other digits in counter 31; therefore, in the event of counter overflow, it is not affected. Whenever the numerical content of up/down counter 31 is not at a reference numerical value and direction digit 171 is in a first signal state R, carriage 10 is urged to move toward the right and, when in a second signal state L, carriage 10 is urged to move toward the left. The startup procedure utilized with the FIG. 1 system initially causes carriage 10 to move to the left by setting direction digit 171 to the second signal state denominated L.

Startup is activated by closing start switch 172 which sets start flip-flop 173 to an active condition. When start flip-flop 173 is in such active condition, a relatively positive presetting signal is supplied over line 175 to up/down counter 31. Lower portion 33 is preset and held to the numerical value K/2 (i.e., a numerical content representative of a movement of carriage 10 equal to one-half the length of a discrete step). Upper portion 32 is set to the reference state, excepting that direction digit 171 is preset to state L by the logic circuitry now described, but may be set to signal state R (i.e., carriage 10 should be moved to the right upon existence of a predetermined condition of carriage 10). Since carriage 10 is initially moved to the left, as shown in FIG. 10, and the system does not know the initial position of carriage 10, it is possible that carriage 10 will attempt to move to the left while at the extreme leftmost end of the path of travel along track 12. Suitable stop means, of course, are provided on the track to prevent carriage 10 from running off the end; however, the startup system must know if carriage 10 has reached the extreme end such that further movement is inhibited even though a left movement of one-half a discrete step is being forced on up/down counter 31 and, hence, motor control system 41. To this end, limit switch 178 is made responsive to carriage 10 reaching the extreme left end of path 12 to complete an electrical circuit to single pulse generator 179. Pulse generator 179 is responsive to the complete electrical circuit to generate a single pulse and supply same over line 180 to set reverse flip-flop 181 to an active condition. Reverse flip-flop 181 was initially reset to an inactive condition by the closure of start switch 172, as indicated by the connection of line 182. When in the inactive condition, reverse flip-flop supplies a relatively negative potential over line 183 which is inverted by inverter 184 to enable AND circuit 185. When enabled, AND circuit 185 is operative to pass the presetting signal on line 175 to line 186 which then sets direction digit 171 and holds same to the signal state L. However, when reverse flip-flop 181 is set to the active condition by single pulse generator 179, a relatively positive signal is supplied over line 183. Inverter 184 is responsive to such positive signal to disable or close AND gate 185, thereby blocking a signal from line 186. Simultaneously therewith, the relatively positive signal on line 183 enables AND gate 190 to pass the presetting signal on line 175 to the "R" input of direction digit 171, thereby reversing the direction indication of that digit position. The motor control system (not shown in FIG. 10) is responsive to the change in signal state of digit position 171 to cause carriage 10 to move to the right.

The indication of the location of carriage 10 at startup is by actual address means 170 being responsive to the position reference indicia (sometimes referred to as "edge-of-work location indicia") to supply position reference signal over line 77. Referring back to FIG. 7, it is seen that this enables the strip address signals to be transferred to strip address register 134. Simultaneously therewith, the position reference signal also presets lower portion 33 of up/down counter 31 to the value K/2. The position reference signal is also supplied over line 191 (FIG. 10) to reset start flip-flop 173, thereby removing the digit presetting signal from line 175. A negative signal on line 175 causes no action by up/down counter 31. Simultaneously therewith, reverse flip-flop 181 is reset. Hence, all of the presetting signals are removed from up/down counter 31, and the motor control system is responsive to the numerical content of up/down counter 31 to move carriage 10 to the center of a work location which is close to the initial unknown position of carriage 10. Upon reaching the center of such work location, the work-location address is loaded into register 136 of FIG. 7, as was previously explained.

Therefore, upon the completion of this minimum movement, the complete address of the present location of carriage 10 is made available to digital computer 27 for computation or generation of the first initial delta address. From the above description, it is readily seen that the maximum startup movement of carriage 10 will be less than two work locations or two discrete steps in that carriage 10 will move until a position reference indicia is detected by actual address means 170 and then move one-half discrete step. Once the position reference indicia is detected, it is seen that the startup circuit is removed from operation of the servomechanism and it already has operation as described in moving to a desired positional location. The just-described system enables an accurate startup with minimum movement, in that carriage 10 does not have to move to reference position from any random location along the path of travel. Such an arrangement may be time saving in starting up a positioning system of the type described. Also, any random work location serves as a reference startup position for the positioning system. The just-described presetting may be used to reset counter 31 upon the detection of equipment malfunction such as to stop carriage 10 in a minimum time. Such presetting is usable to abort a movement initiated by a previously supplied initial delta address.

The system illustrated in FIG. 1 has been described in a manner that digital computer 27 contains all of the information necessary for generating initial delta addresses for any positional movements of carriage 10. It is not necessary to employ a general purpose digital computer for the successful practice of the present invention. A simply designed logic sequencer may be substituted for digital computer 27. Actually, various design approaches may be followed in the construction of such a logic sequencer. The table of spaces 23 between adjacent ones of the address strips 20 may be stored in a read-only memory, and a simple calculation mechanism may be provided for calculating initial delta address. Alternatively, in a system wherein it is desired to employ as few logic circuits as possible, other means may be provided for generating the initial delta address and operating the system in a mode wherein the initial delta address does not necessarily count the discrete steps contained in spacings 23. For example, upon the installation of a system, indicia may be added to the various address strips at their respective ends indicating the number of discrete steps to the next address strip. Simple circuitry can be made responsive to such indicia to either add such number of discrete steps to upper portion 32, or gating means may be provided between lower portion 33 and upper portion 32 to prevent the passage of count pulses therebetween thereby not altering the delta address in upper portion 32 during traversal of such spacings. Testing has shown that the illustrated embodiment appears to provide the fewest timing and positional problems in a positioning system. An advantage of the present system is the initializing operation (i.e., startup operation).

While the illustrated embodiment uses a so-called "count to a reference" to effect positioning a member to a desired location, no limitation thereto is intended. That is, up/down counter 31, instead of counting to a first reference signal state for indicating that carriage 10 has reached a desired location, could count from a reference state to the magnitude of the initial delta address. In such a modification within the scope of the invention, the initial delta address could be retained in initial delta-address registers 29. The signal state of registers 29 and of up/down counter upper portion 32 could be supplied to a differencing circuit which would supply a control signal corresponding to the previously described "present delta address" to motor control circuit 41 in accordance with the difference in numerical contents of counter upper portion 32 and one of the registers 29. The lower portion 33 of counter 31 could supply its signal state to the same differencing circuit for generating an error signal with respect to a standard or the numerical contents thereof could be the error signal. Inserting a new initial delta address into the system can be easily accomplished by simultaneously resetting up/down counter 31 to a reference state (all zero's, for example) and presetting such one address register to the new initial delta address. Of course, when the numerical contents of up/down counter 31 and register 29 are identical, motor means 11 can be either actuated to hold carriage 10 or be deactivated, as may be desired. The above discussion is by way of example only, it being understood that many different approaches to position measurement and control may be effected while still successfully practicing the present invention.

The range of operation (i.e., length of track 12) of carriage 10 in the FIG. 1 illustrated system is extendible without modification of system design up to the modulus of upper portion 32 in up/down counter 31. Since a two-mode motor control means is utilized, an extended range of carriage 10 travel does not alter the saturated mode or maximum rate of operation of the motive means. By merely changing the modulus of upper portion 31, the distance of travel of carriage 10 is of arbitrary length. The positioning accuracy is not at all adversely affected by such an extension of travel with respect to shorter travel designs. The recalibration of lower portion 33 of up/down counter 31 enables the positioning system of this invention to maintain its desired positioning accuracy without regard to distance of travel. Another factor is minimum startup time afforded by the described startup system. In long positioning systems, such as those of 50, 100, 500, or more feet, such an immediate determination of initial actual position and the use of such actual position as an initial startup reference becomes more important; thereby enabling a more facile long travel positioning system.

While the invention has been particularly shown and described with reference to preferred embodiments thereof, it will be understood by those skilled in the art that various changes in form and details may be made therein without departing from the spirit and scope of the invention.

What we claim is:

1. A digital position measurement system adapted to be operatively associated with first and second members relatively movable along a given path, the measurement system including in combination:

actual address means having a plurality of digital address indicia disposed along said path indicative of actual relative locations of said members, said path being divided into a plurality of predetermined dimensions, position reference indicia precisely indicative of given relative location reference points on said path in a given spatial relation to locations of said members indicated by said digital address indicia, respectively, said actual address means supplying electrical signals indicative of said digital address indicia and said position reference indicia, incremental displacement measuring means operatively associated with said members for indicating incremental displacements and direction thereof between said members independent of said actual address means, digital delta-address means for storing an initial delta-address indicative of a necessary relative displacement of said members to reach a desired one of said locations and being jointly responsive to said initial delta-address and to said indication of incremental displacement to supply a present delta address indicative of the difference therebetween and further responsive to said position reference indicia to preset a selected portion of said present delta address for calibrating said present delta address to a numerical value indicative of an integral number of said predetermined dimensions along said given path.

2. The measurement system of claim 1, further including control means operatively associated with said actual address means for receiving said signals indicative of said digital address indicia and being selectively responsive thereto to generate a set of digital initial delta-address signals, and means for selectively transferring said digital initial delta-address signals to said digital delta-address means.

3. The measurement system of claim 2, wherein said digital address indicia are disposed in a plurality of strips, each strip having indicia of a plurality of contiguous locations along said given path, said strips being spaced apart along said given path by varied spacing dimensions, said spacings capable of being other than an integral number of said predetermined dimensions, spacing means for supplying spacing digital signals indicative of said spacings as an integral number of said predetermined dimensions, and said control means being responsive to said spacing digital signals to effect successive delta-address indications by said digital delta-address means in accordance with said spacing digital signals in addition to said indications of said incremental displacement means altering said initial delta-address such that relative motion of said members traversing some of said spacings is indicated as an integral number of said predetermined dimensions.

4. The measurement system of claim 3, wherein each said strip has a plurality of rows of said digital indicia, indicia in each row arranged in groups in accordance with said locations and being respectively indicative of the respective location, said digital indicia being directed into groups of strip-identifying indicia and location-identifying indicia, said strip-identifying indicia being disposed intermediate each adjacent location in said strip plus at both extremities of said strip along said given path with said location indicia being interposed between said strip indicia in each of said strips, each strip further including control indicia associated with said digital indicia for indicating whether the address indicated thereby is a strip or location address.

5. The measurement system of claim 4, wherein said control indicia is narrower along said given path than the respective digital indicia, said actual address means being nonresponsive to said digital indicia intermediate said control indicia.

6. The measurement system of claim 5, wherein said control indicia associated with said strip address indicating digital indicia is said position reference indicia and has a width along said given path a predetermined number of incremental displacements, said actual address means receiving said indications of incremental displacements and being jointly responsive to said position reference indicia and said indication of incremental displacements to generate said electrical signal indicative of said position reference indicia during one of said incremental displacements occurring in a predetermined relation to said position reference indicia.

7. The measurement system of claim 6, wherein said control means includes a programmable digital computer having a memory, said spacing means constituting stored signals in said memory as a table of spacing lengths and addresses thereof, said control means supplying said spacing digital signals to said digital delta-address means as a part of said initial delta-address such that said spacings are measured in the same manner as said strips.

8. Digital position indicating means for a pair of relatively movable first and second members wherein the second member has means for sensing indicia, the indicating means including the combination:

a plurality of groups of spatial-address indicia stationarily disposed in a predetermined relation with respect to said first member, each group having a plurality of location indicia, each location having a predetermined dimension along a given direction of relative movement, said groups being disposed along said given direction of relative movement, said groups being disposed along said given direction of relative movement between said members in a spaced-apart relationship capable of having spacings between adjacent ones of said groups varied in a nonintegral relationship to said predetermined dimension, each group having a plurality of sets of identical unique group-identifying indicia disposed respectively on both sides of each said location indicia along said direction of relative motion.

9. The indicating means of claim 8, wherein each said spatial-address indicia further includes position reference indicia associated with each said group indicia for identifying same as group indicia and further having a precise spatial relationship to the respective location for enabling a precise recalibration regarding relative movements of said members.

10. A linear positioning system of the numerical type for accurately positioning first and second relatively movable members over an extended range of incremental relative movements along a given path, each relative movement being expressible numerically as a given number of discrete steps, each discrete step including a predetermined number of incremental displacements, the improvement including in combination:

a plurality of work locations along said given path at which predetermined functions may be performed, each location having a predetermined positional relation to respective given ones of said discrete steps, some of said discrete steps not having said positional relation to said locations, said members having to traverse spacings between adjacent ones of said locations being other than an integral number of said discrete steps, incremental displacement measurement means sensing and indicating relative displacements between said members, actual address means independent of said measurement means indicating actual relative positions of said members at each said location and indicating a precise relative position of said members with respect to said locations irrespective of said actual address, digital control and motive means responsive to said actual relative location indication to generate an initial digital delta address indicative of relative displacements of said members to desired locations and expressed as an integral number of said discrete steps and being further responsive to said incremental displacement measurement means to generate a present digital address from said initial digital delta address and including measurements of said nonintegral spacings, and being further responsive to said precise position indication when said present digital delta address indicates a nonintegral number of discrete steps at any one of said precise position indications to adjust said present delta address to represent an integral number of said discrete steps.

11. The positioning system of claim 10, wherein said control and motive means includes:

motor means for effecting relative movements of said members, up/down counter means for receiving said initial delta address and containing said present delta addresses as numerical contents, being responsive to said incremental displacement measurement means indications to alter the numerical contents thereof in accordance with said incremental indications and having a reference signal state indicative of a reference numerical content, and servocontrol means operatively controlling said motor means in response to the numerical contents of said up/down counter means to cause a relative movement whenever said up/down counter means has a numerical content other than said reference numerical content and further responsive to said reference signal state to actuate said motor means to positively hold said members against relative movements.

12. The positioning system of claim 11, wherein said control and motive means further includes program means storing a list of said spacings and an equivalent number of said discrete steps representative of lengths of said spacings irrespective of said nonintegral number of discrete steps therein, said equivalent number of discrete steps ignoring nonintegral portions less than one-half of said discrete steps and counting as a complete discrete step nonintegral portions greater than one-half of said discrete steps, and said program means being operative to compare said list with said actual address indication and a desired address indication for determining the number of discrete steps in spacings between locations corresponding to said actual address and said desired address and then being operative to generate an initial delta address in accordance therewith.

13. The positioning system of claim 12, wherein said actual address means includes a plurality of address strips stationarily associated with said first member and disposed in spaced-apart relationship along said given path, each address strip being positioned on said first member independent of positions therein of any other address strip, each said address strip including a plurality of location actual address indicia, each such location actual address indicia including two sets of identical strip indicia spaced apart along said given path at the extremities of each such location along said given path with a location address with respect to such strip disposed intermediate said strip indicia, position reference indicia having a predetermined and precise relationship to such location disposed at each said extremity along said given path and further identifying said strip indicia, and said actual address means further including, indicia sensing means on said second member movable to an operative position with any one of said address strips and responsive thereto to indicate actual address and precise position reference.

14. The positioning system of claim 13, wherein each said discrete step is identical in length, and further including:

up/down counter means in said control and motive means having a lower portion of a modulus equal to said predetermined number of incremental displacements and an upper portion for containing a delta address expressed as an integral number of discrete steps, said upper portion receiving said initial delta address and being responsive to said lower portion counting past a predetermined count to alter its numerical contents in accordance therewith, and said lower portion being responsive to said position reference signal to assume a signal state representative of one-half said predetermined number of incremental displacements from a reference signal state indicative of a center of said discrete steps, said up/down counter means being responsive to said relative displacement indications to alter its numerical contents in accordance therewith, and said control and motive means being responsive to numerical contents in said up/down counter means to effect relative movement of said members in a direction and extent to alter the numerical contents of both said portions to a reference state.

15. A digital positioning system for positioning first and second relatively movable members over an extendible range along a given path of relative movements while maintaining location accuracy, a plurality of first digital indicia on said first member indicative of a plurality of discrete relative locations spaced along said path, each having a given dimension, spacings between some of said first indicia being varied from said given dimensions in a nonintegral manner, a like plurality of second indicia on said first member precisely located with respect to said discrete locations, digital displacement measuring means responsive to relative movements of said members to supply count signals indicative of incremental displacements and direction thereof along said given path, sensing means on said second member responsive to said first and second indicia to supply actual address and position reference signals respectively, indicative of actual relative positions of said members, program means responsive to said actual address signals to generate an initial digital delta address for a desired actual address to which said members are to relatively move and including table means indicating effect of said spacings on said initial delta address, said initial address including said effect of said spacings, up/down counter means having upper and lower portions, said upper portion receiving said initial delta address from said program means, said lower portion having a modulus numerically indicative of said given dimension, each portion capable of having a reference signal state, said up/down counter means being responsive to said count signals to alter the contents thereof from said initial delta address for generating a present delta address, all counting proceeding from said lower portion to said upper portion, motor means operatively associated with said members and responsive to said up/down counter means containing a delta address to cause a relative displacement of said members effective to alter the contents of said up/down counter means toward said reference signal states and further responsive to said up/down counter means being in said reference states to hold said members from further relative displacements, and said lower portion being responsive to said position reference signal to assume a signal state incrementally representative of said second indicia location thereby compensating for nonintegral variations of said spacings from said given dimension to enable an accurate positioning based upon a delta address representing an integral number of said discrete addresses.

16. A linear digital position measurement system for use with first and second relatively movable members, motor means including motor control means operating associated with said members for effecting relative displacements between said members, the system including in combination:

sets of spaced-apart digital indicia stationarily associated with said first member along a direction of relative movement for indicating actual relative discrete locations between said members, each said location having a predetermined dimension along said direction, spacings between some of said indicia being different from other spacings between other indicia, said spacings capable of having nonintegral dimensional relationships with respect to said predetermined dimensions, each said set of digital indicia including precise reference indicia indicative of a given precise relative position of said members with respect to the respective said relative locations indicated by said digital indicia;

sensing means on said second member capable of sensing said indicia and operative to supply signals indicative thereof including actual address signals and a precise position reference signal;

incremental displacement measuring means disposed in cooperating relationship with said members for measuring relative displacements therebetween irrespective of said discrete locations and supplying count signals indicative of predetermined incremental displacements and a direction signal indicative of relative displacement;

programmable control means for receiving said actual address signals and operative to supply initial delta-address digital signals indicative of the number of said locations and spacings to be traversed by said members to reach a desired discrete location;

up/down counter means having upper and lower portions, said upper portion receiving said initial delta-address digital signals, said lower portion receiving said count signals and being responsive thereto to count same for indicating incremental displacements and responsive to said direction signal to effect a count up or a count down for indicating direction of such relative incremental displacements and indicating to said upper portion when said second member passes one of said locations, said upper portion being responsive to such latter indication to alter said initial delta-address in accordance therewith;

said motor control means being responsive to said up/down counter means containing a delta-address to cause said motor means to effect a relative displacement in a direction to alter the signal contents of said up/down counter means toward a first reference count in each of said portions, said effected displacement being representable by the numerical contents of said upper portion;

said lower portion being responsive to said position reference signal to assume a second reference count irrespective of the contents of said upper portion and such that when the numerical content of said upper portion is said first reference count said motor means effects a relative displacement in accordance with said second reference signal state of said lower portion with respect to said desired location and, further, when said upper portion has a numerical content other than said first reference count, to adjust such relative movements to an integral number of said discrete locations whereby said randomness of spacings or any incremental displacement measurement error is erased.

17. The method of positioning first and second relatively movable members, including the following steps in combination:

determining the present relative location thereof and generating a digital initial delta address indicative of distance to be relatively moved by said members to a desired location as a given number of discrete steps, measuring relative movement of said members as numbers of incremental displacements with a predetermined number of said incremental displacements being equal to one of said discrete steps, relative motion of said members being other than an integral number of said discrete steps, altering said delta address in accordance with said incremental displacements irrespective of the number of discrete steps traversed with said alteration generating a delta address other than an integral number of said discrete steps, establishing a plurality of precise reference indicia along a direction of relative motion of said members, each indicia representative of one boundary of a discrete step, and recalibrating the altered delta address at each reference indicia to an integral number of discrete steps.

18. The method of claim 17, further including the steps of independently ascertaining the relative location of said members when said altered delta address indicates a desired location has been reached and establishing said desired location as a new base of positioning reference for a new digital initial delta address to thereby cause a new movement controlled solely by said new digital initial delta address.

19. The method of controlling a positioning motor, incrementally sensing motions caused by said motor, sensing actual relative location of two members relatively movable by said motor, and supplying a set of digital signals representative of such actual location, generating a delta address from desired relative location and said actual relative location indications, actuating said motor in accordance with said delta address, during relative motion of said members establishing from fixed indicia one of said member's position reference signals indicative of precise reference points of relative motion in accordance with a plurality of discrete steps substantially greater than said incrementally sensed motions, and recalibrating said delta address to an integral number of said discrete steps with each of said reference signals.

20. A system for relatively positioning first and second members along a given path, including the combination:

actual address means having a plurality of digital address indicia disposed along said path indicative of actual relative locations of said members, said path being divided into a plurality of predetermined dimensions, position reference indicia precisely indicative of given relative location reference points on said path in a given spatial relation to locations of said members indicated by said digital address indicia, respectively, said actual address means supplying electrical signals indicative of said digital address indicia and said position reference indicia;

incremental displacement measuring means operatively associated with said members for indicating incremental displacements and direction thereof between said members independent of said actual address means.

digital delta address means jointly responsive to said actual address means, said incremental displacement means and desired actual address location signals to repetitively generate a present digital delta address indicative of distance to go; and recalibration means responsive to each said position reference indicia signals to repetitively calibrate said present digital delta address to a numerical value respectively indicative of an integral number of said predetermined dimensions.

PO-1050
(5/69)

UNITED STATES PATENT OFFICE
CERTIFICATE OF CORRECTION

Patent No. 3,584,284          Dated June 8, 1971

Inventor(s) Laurence R. Beach and Paul Hardy

It is certified that error appears in the above-identified patent and that said Letters Patent are hereby corrected as shown below:

Column 1, line 72, "along" should read --long--.

Column 2, line 5, "tight" should read --tighter--.

Column 6, line 71, "$2^{n+-}$Up/down" should read --$2^{n+1}-1$. Up/down--.

Column 9, line 63, "dashed" should read --dimension--.

Column 13, line 51, "19" should read --119--.

Column 14, line 34, "and" should read --AND--.

Column 16, line 20, "$2^{n11}$" should read --$2^{n-1}$--; and "$2^{n12}$" should read --$2^{n-2}$--.

line 23, "$2^{k11}$" should read --$2^{k-1}$--.

line 26, "$2^{n13}$" should read --$2^{n-3}$--.

line 50, "$2^{n13}$" should read --$2^{n-3}$--.

line 58, "$2^{n13}$" should read --$2^{n-3}$--.

Column 21, lines 7 and 8, delete ", said groups being disposed along said given direction of relative movement".

Column 23, line 37, "operating" should read --operatively--.

line 59, "cooperating" should read --cooperative--.

Signed and sealed this 9th day of November 1971.

(SEAL)
Attest:

EDWARD M. FLETCHER, JR.          ROBERT GOTTSCHALK
Attesting Officer                   Acting Commissioner of Patents